United States Patent [19]

Kiridena et al.

[11] Patent Number: 5,659,493
[45] Date of Patent: Aug. 19, 1997

[54] VIRTUAL MACHINING TECHNIQUES FOR MODIFYING COMPUTER MODELS OF PARTS

[75] Inventors: Vijitha Kiridena, Inkster; Samuel Edward Ebenstein, Southfield; Gregory Hugh Smith, Ann Arbor, all of Mich.

[73] Assignee: Ford Motor Company, Dearborn, Mich.

[21] Appl. No.: 398,233

[22] Filed: Mar. 3, 1995

[51] Int. Cl.$^6$ .................................................. G06T 17/40
[52] U.S. Cl. ............................................. 364/578; 364/560
[58] Field of Search ..................... 364/578, 474.24, 364/474.05, 560, 474.01, 474.02; 382/8; 356/3.01

[56] References Cited

U.S. PATENT DOCUMENTS

| | | | |
|---|---|---|---|
| 4,805,224 | 2/1989 | Koezuka et al. | 382/8 |
| 5,027,281 | 6/1991 | Rekow et al. | 364/474.24 |
| 5,043,906 | 8/1991 | Jepson | 364/474.34 |
| 5,101,363 | 3/1992 | Rutkowski | 364/578 |
| 5,119,309 | 6/1992 | Cavendish et al. | 364/474.24 |
| 5,121,333 | 6/1992 | Riley et al. | 364/474.05 |
| 5,121,334 | 6/1992 | Riley et al. | 364/474.05 |
| 5,128,870 | 7/1992 | Erdman et al. | 364/474.05 |
| 5,150,305 | 9/1992 | Sekikawa | 364/474.26 |
| 5,184,306 | 2/1993 | Erdman et al. | 364/474.05 |
| 5,245,544 | 9/1993 | Yamamoto et al. | 364/474.22 |
| 5,257,203 | 10/1993 | Riley et al. | 364/474.05 |
| 5,265,197 | 11/1993 | Kondo | 395/120 |
| 5,274,574 | 12/1993 | Tsujido et al. | 364/551.02 |
| 5,295,200 | 3/1994 | Boyer | 382/43 |
| 5,307,421 | 4/1994 | Darboux et al. | 382/8 |
| 5,442,572 | 8/1995 | Kiridena et al. | 364/560 |

*Primary Examiner*—Kevin J. Teska
*Assistant Examiner*—Matthew Loppnow
*Attorney, Agent, or Firm*—Joseph W. Malleck; Robert L. May

[57] ABSTRACT

Methods and apparatus for representing a three-dimensional object by means of a High Density Point Data Model (HDPDM) consisting of a large number of individual data values, each of which specifies the coordinates of a point on the surface of a three dimensional object. An initial HDPDM is produced by scanning a physical object, tessellating the elements of a CAD representation of the object surface, or evaluating mathematical expressions which describe the surface. Further data values define a virtual tool surface which is spaced from the modeled object surface. The projection of the virtual tool surface on the object surface along projection lies parallel to a defined axis of projection identifies selected points on the surface which are modified by effectively moving them to the tool surface. The tool surface may be translated with respect to the object surface along a predetermined trajectory, with the tool surface being iteratively used to operate on an area of projection on the model surface to provide a virtual machining process which performs free-form alterations on the data model. The finished data model may then be used to create a physical part or generate an output CAD or mathematical model which defines a free-form part.

18 Claims, 2 Drawing Sheets

VIRTUAL MACHINING TECHNIQUES FOR MODIFYING COMPUTER MODELS OF PARTS

FIELD OF THE INVENTION

This invention relates to electronic data processing systems and more particularly to methods and apparatus for representing, modeling and modifying free-form three dimensional objects.

BACKGROUND OF THE INVENTION

Free-form shapes are becoming much more common in today's designs, but are not readily manipulatable using conventional computer techniques which typically represent objects using either mathematical representations or combinations of discrete shapes. Making changes to a typical CAD model or mathematical representation of a free-form object is typically quite difficult and non-intuitive. Moreover, free-form object models based on approximate collections of shapes or mathematical relationships are inherently imprecise. Although object shape data may be based on accurate measurements taken by a laser scanner or the like, such free-form data must typically be translated into approximate mathematical equations or shape segments for processing by available systems.

It is accordingly an objective of the present invention to more easily and more accurately model and manipulate free-form shapes and objects to facilitate the design, manufacture and inspection of products which incorporate these shapes.

SUMMARY OF THE INVENTION

The present invention models free-form objects in a way that allows the user to operate directly on the surface representation of those objects without relying on complex mathematical representations of the object shapes. In accordance with a principle feature of the present invention, objects and shapes are represented by means of a novel data representation which will be referred to as a "High Density Point Data Model" or "HDPDM." The HDPDM is a 'cloud' of three dimensional data points which may be obtained from a physical part, a mathematical model, or a CAD model. Each data point typically specifies the coordinates in three dimensional space of a corresponding point on the flee-form object being modeled. By modifying an HDPDM the user creates a new HDPDM which models a new object. This new HDPDM may be used to create a new physical part, or a new mathematical model, or it may be used directly to analyze the properties of the modified part.

A variety of input means may be used to produce the initial stored digital values forming the HDPDM: the data points may be obtained by direct measurement of a physical object: e.g., by scanning a physical part or specimen object with a laser scanner or the like, or may be derived from an existing computer model, e.g., by tessellating the individual discrete shape elements that make up an available CAD model, or by evaluating mathematical relationship(s) used to model a given shape. Each of these techniques can be used to obtain the coordinates of those points which are on the surface of the object in the selected n-dimensional coordinate system. Each such surface point is accordingly represented by a set of digital values stored in memory to specify the coordinates of the modeled surface point.

In accordance with a further feature of the invention, the HDPDM model is directly manipulated by means of a "virtual machining process" which utilizes a "virtual tool surface" which alters selected data points to modify the model. Preferably, means are employed to store coordinators in memory which specify the virtual tool surface which is positioned in an n-dimensional coordinate system. In addition, means are employed for defining an axis of projection in the same coordinate system. Each given point on the object surface, which lies inside the projection of the virtual tool surface, along a line parallel to the axis of projection, is then identified, and the identified object surface point is then effectively moved to its corresponding aligned virtual tool surface point, thereby forming a new HDPDM model of the altered object in the memory.

In accordance with the invention, the tool may be iteratively moved in increments relative to the surface represented by the HDPDM, with the points of projection on the object surface being moved to the tool surface after each incremental movement. For example, conventional transform mechanisms may be used to translate the relevant portion of the HDPDM model data with respect to the tool surface, which remains fixed with respect to the spatial coordinate system used to represented the incrementally moving surface points.

In accordance with a further feature of the invention, at the conclusion of the iteration process, utilization means are employed to render the final shape represented by the resulting HDPDM. The utilization device may consist, for example, of numerically controlled machining equipment for producing finished parts corresponding to the model, or additional computer processing instrumentalities which translate the final HDPDM into an equivalent (approximate) CAD model or mathematical representation of the resulting shape.

This virtual machining method has the advantage of being unconstrained by underlying mathematical representations: the data is the model and modifying the data modifies the model. The virtual machining technique is particularly useful for performing operations that are often difficult to perform on free form shapes for traditional CAD systems, such as adding fillets between adjoining free-form shapes, adding draft along free-form parting lines, or eliminating feather edges at the boundaries of free-form solids. By modifying the HDPDM the user creates a new HDPDM that may be used to create a new physical part, a new CAD model, or used to analyze the properties of the new model.

These and other features and advantages of the present invention may be more clearly understood by considering the following detailed description of a preferred embodiment which is presented in connection with the attached drawings.

DESCRIPTION OF THE PREFERRED EMBODIMENT

The embodiment of the invention to be described provides a mechanism for modifying a computer representation of a free-form part which allows the user to operate directly on the surface representation without relying on a complex mathematical representation of the shape. The mechanism uses a data representation here called a "High Density Point Data Model" or "HDPDM," which may be obtained from a physical part, a mathematical model, or a CAD model. The HDPDM is a set of three dimensional data points which are modified by "virtual machining techniques" to produce a further HDPDM, which in mm may be used to create a new physical part, a new CAD model, or used to analyze the properties of the new model.

Each data point is preferably stored in memory as an (x, y, z) triplet of floating point values. The data is considered to be stored as $x(i, j)$, $y(i, j)$, $z(i, j)$ where i and j are indices that vary between (1, max x) and (1, max y) respectively. The virtual machining process alters the values of x, y, z without changing the memory location since the i, j indices which are used to reference the point (x, y, z) before virtual machining still are used to reference the new point (x', y', x') as well.

Each data point in an HDPDM model may be derived by actually measuring the position of surface points on a physical specimen. As illustrated at 12 and 13 in FIG. 1, a dense set of surface points may preferably be produced by actual measurement using conventional laser scanners which provide information about the surface of the measured part.

Figure 1:
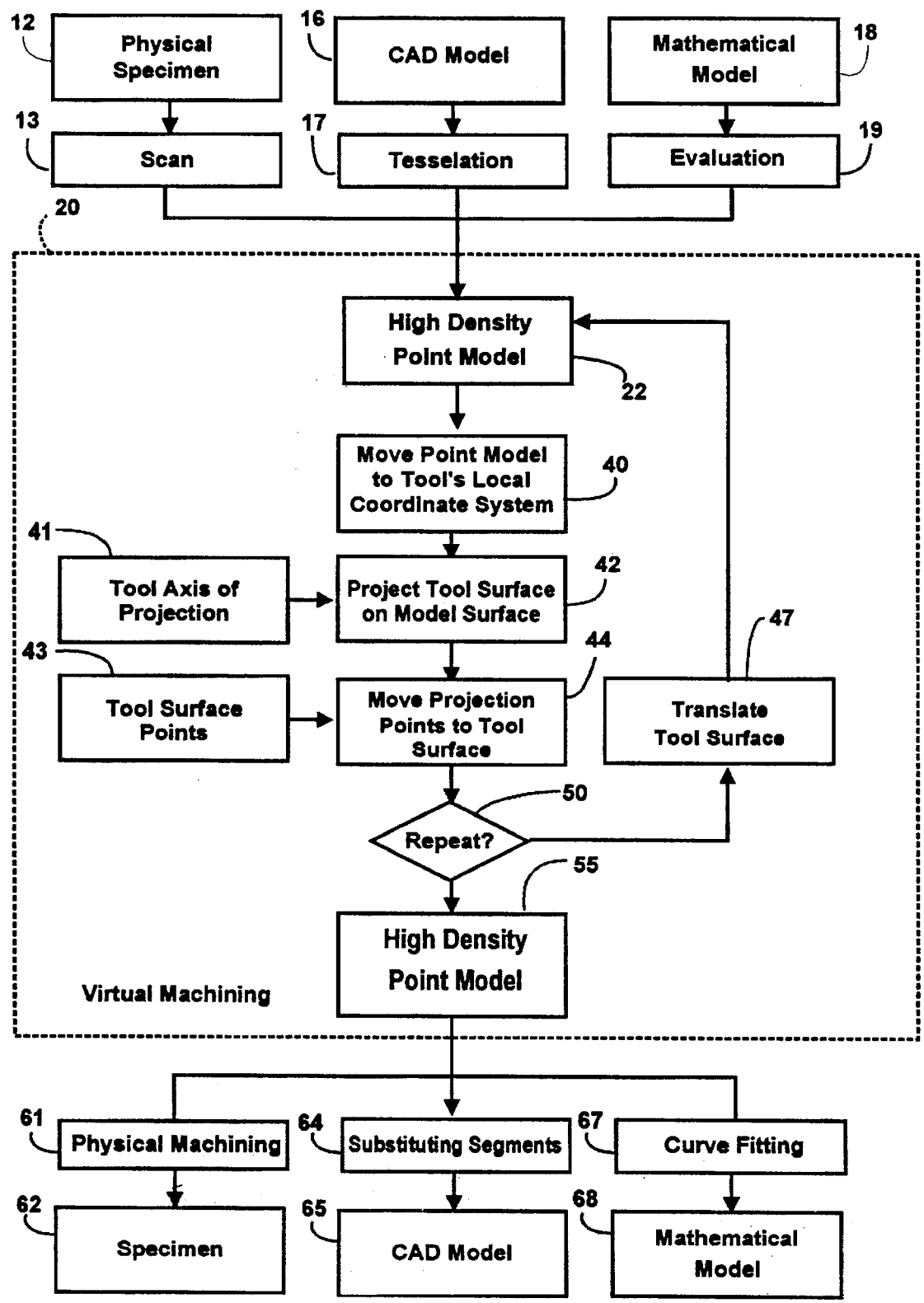
FIG. 1 is a data flow diagram which illustrates the principle functional components of an illustrative embodiment of the invention.

Alternatively, as indicated at 16 and 17 in FIG. 1, HDPDM data may be derived from an CAD(Computer-Aided Design)models. CAD models take a variety of forms, and are typified by the models created and manipulated by the following widely used CAD systems:

1. CADDS, available from Computervision Corp., 100 Crosby Dr., Bedford, Mass. 01730-1480, and
2. Pro/Engineer, available from Parametric Technology Corp., 128 Technology Dr. Waltham, Mass. 02154.

In such CAD systems, a surface is commonly modeled by a set of discrete surfaces each of which is a mathematical approximation of the actual surface at a localized region of the overall shape being modeled. Each such discrete local surface can be represented by a mathematical approximations to the ideal surface which can be considered to take the form of mathematical functions f,g,h where $x = f(u, v)$
$y = g(u, v)$, and
$z = h(u, v)$ where u and v are two independent parameters, and f, g, h are typically high order polynomials in u and v. These local surfaces are converted to the actual surface position data for the region by a conventional process called "tessellation" as indicated at 17 in FIG. 1.

In addition, numerous mathematics-based design programs are also available which accept input parameters from the user and which utilize mathematical relationships to define a surface. The conversion of the supplied input parameters and the mathematical relationships into actual surface position data, as indicated at 18 and 19 in FIG. 1, involves processing to evaluate predetermined mathematical relationship(s) to finds all points (x, y, z) which generally satisfy some relationship of the form $F(x,y,z) = 0$.

Conventional routines for manipulating data representing shapes and objects, including transforms for moving data modes with respect to and between different coordinate systems, for tessellating discrete CAD model segments, and for performing "curve fitting" to approximate point data by means of mathematical relationships and CAD segments, are used in typical CAD and graphics programs. In addition, packaged routine libraries such, as the Media Vision OpenGL SDK for Windows NT, available from Media Vision, Inc., 47300 Bayside Pkwy., Fremont, Calif. 94538, are available standard routines which enable software developers to create programs for visualizing and manipulating three dimensional object models. Such standard routines are commonly used in software designed for product design and development, architectural rendering, animation, virtual reality, and medical imaging applications, and support pixel operations, dithering, transformations, selection and feedback, tessellation, and the manipulation of polygons, NURB surfaces, curves and surfaces.

The present invention does not rely on underlying mathematical representations of object shapes, but instead directly manipulates data which indicate actual object shape and position. A principal benefit of the HDPDM is that it does not suffer from the major deficiencies of the alternative approaches of CAD or math models. The HDPDM does not have the interpolation or approximation error of the CAD model, nor does it have the constraints of the math model data. It is often extremely difficult to modify the math model to incorporate changes required by engineering and/or manufacturing considerations.

THE VIRTUAL MACHINING PROCESS

The present invention employs a process, generally called "virtual machining" and indicated within the dashed-line rectangle 20 in FIG. 1, to modify an HDPDM 22 created from a physical object or from a CAD or mathematical model as described above.

As described below, modifications to the HDPDM surface model 22 may be efficiently performed on the HDPDM directly without the need to approximate the surface with a mathematical representation such as a group of trimmed NURB surfaces. The HDPDM 22 defines a dense set of points on the surface of the object to represent the object. Any point Pi on the surface of the model is represented as a function of its position Xi, Yi, Zi. That is:

$Pi = FI(Xi, Yi, Zi)$

Since the surface is defined by a collection of points (the HDPDM) each point is defined implicitly and no explicit definition is required in order to represent or modify the model. The model may be modified by moving the points. Such modification is not constrained by an underlying mathematical representation as in the case of operating on a NURB representation of a surface.

Figure 2:
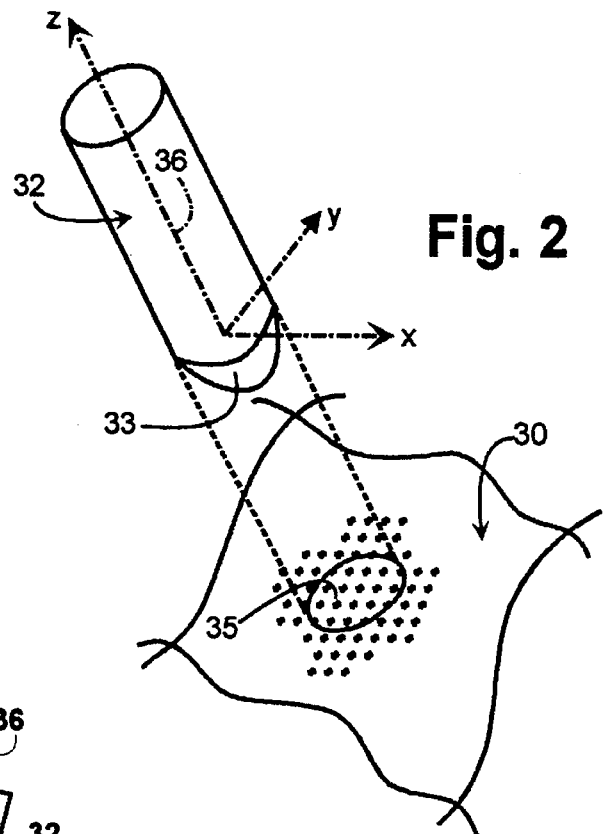
FIG. 2 is a perspective view of a surface shape positioned relative to a virtual tool surface as contemplated by the invention, and FIGS. 3, 4 and 5 respectively illustrate an object surface before modification, after modification by a virtual tool positioned below the object surface, and after modification by a virtual tool surface positioned above the object surface.

The virtual machining technique contemplated by the present invention utilizes one or more "virtual tool surfaces" to modify the HDPDM point representation of the object. FIG. 2 of the drawings illustrates the relationship between an object surface indicated generally at 30 and the surface 33 of a tool indicated generally at 32.

In order to perform local modifications on the object surface 30 which is represented by the HDPDM data 22, it is first necessary to define a region of influence for the modification. The region of influence, seen at 35 in FIG. 2, is defined by the projection of the cross section of the tool surface 33 along an axis of projection 36 upon to the surface 30. The surface in this region may be modified by replacing each point Pi at each point Xi, Yi, Zi within the region of influence 35 with a new point Pi' such that $Pi' = F2(Xi, Yi, Zi)$ where F2 describes the shape of the virtual tool surface 33.

Figure 3:
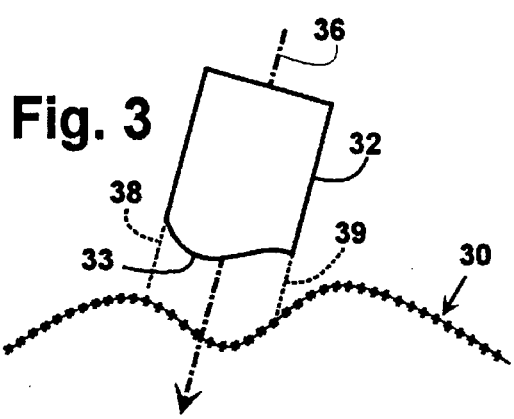
Figure 5:
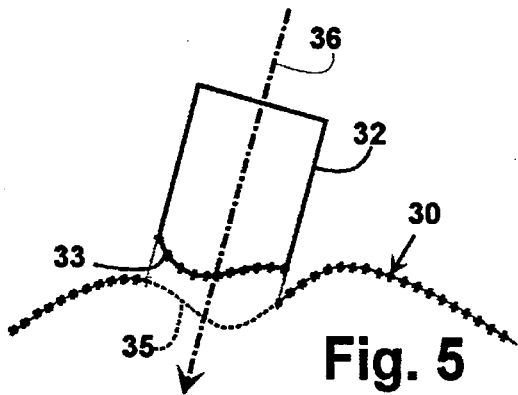
Figure 4:
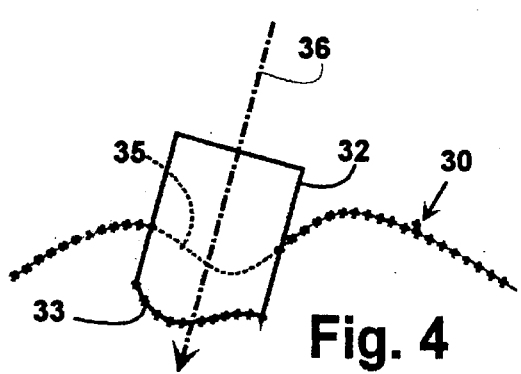

FIGS. 3, 4 and 5 illustrates the manner in which the tool surface 33 is used as a reference to modify the object surface 30 in the region of influence 35. FIG. 3 shows the tool 32 positioned such that the virtual tool surface 33 is spaced from the object surface 30 defined by the points which make up the HDPDM 22, each of which is represented by a small "x" on the surface 30. Projection lines 38 and 39 which are aligned parallel with the axis of projection 36 of the tool circumscribe the boundaries of the region of influence 35 which is projected onto the object surface 30. The tool axis of projection is preferably aligned with one dimension of coordinate system used. The tool surface 33 may have any orientation and displacement with respect to surface 30 and, as a consequence, the surface 30 may be modified by pushing points down under the tool parallel to the axis 36 of the tool as illustrated in FIG. 4, or by pulling points up to the tool surface 33 as illustrated by in FIG. 5.

The tool surface 33 may be translated iteratively with respect to the object surface 30, with surface modifications being performed at each position to produce modifications along a predetermined tool trajectory.

In order to accomplish these modifications the original point model is first moved to the tools' local coordinate system by using a transformation matrix, as indicated at 40 in FIG. 1. The projection of the tool surface 33 on the object surface 33 along the tool axis 36 is then determined as indicated at 42 in FIG. 1. Next, as indicated at 44 in FIG. 1, each point on the surface 30 that lies within the area of influence 35 is modified by moving that point in the direction of the tool axis 36 until the point is repositioned on the virtual tool surface 33.

As seen in FIG. 2, if the axis of projection 33 is aligned with the z-axis of the coordinate system, the points in the HDPDM model which lie within the region of influence 35 are readily identifiable as those points having x and y coordinates which lie within the x-y coordinate boundaries of the tool surface 33. Translating the position of a point at a given pair of x-y coordinates on the surface 30 accordingly requires nothing more than substituting the z displacement value for the tool surface at the x-y coordinate for the z coordinate of existing surface point at that x-y coordinate.

For many virtual machining operations, moving the projection of an existing portion of the model surface into conformity with a predefined tool surface (which may be arbitrarily detailed) will suffice. Frequently, however, it will be desirable to move the tool and the model surface with respect to each other in a sequence of steps, just as a mechanical cutting tools used in physical milling operations are moved with respect to the work piece. In virtual machining, the tool surface may be moved to a different position relative to the HDPDM data points as indicated at 47 in FIG. 1. The process then resumes at 40 with the relevant portion of the HDPDM point model (the surface 30) being moved by a transformation matrix operation into the coordinate system of the tool, with the points in a new area of influence 35 being newly determined as indicated at 42, and then moved to the tool surface as indicated at 44. Finally, when a conditional loop test performed at 50 indicates that the tool has reached the end of its trajectory, the finished HDPDM depicted at 55 is ready for utilization.

As an illustration, the virtual machining technique may be employed to add a fillet along the joint between two planar object surfaces which intersect at right angles. The virtual tool surface could take the form of a quarter-cylinder which extends along the entire length of the joint tangentially abutting both planar surfaces or, in the alternative, the virtual tool could take the form of a single line arc (a surface one data point wide) which is iteratively translated with respect to the planar surfaces along the length of the joint.

APPLICATIONS

The finished HDPDM 55 produced at the conclusion of the virtual machining stage 20 may be utilized in a variety of ways. The point values of the HDPDM 55 may be utilized to produce an actual physical object which corresponds to the model using numerically controlled physical machining devices and the like as illustrated at 61 and 62 in FIG. 2. Alternatively, groups of points in the HDPDM may be used to form the discrete surface segments of a CAD model as indicated at 64 and 65, or the curve firing routines may be used to reduce the HDPDM points to sets of mathematical relations forming an approximate mathematical model of the resulting object as indicated at 67 and 68 in FIG. 1.

The virtual machine technique which has been described may be used to advantage in a variety of applications for which conventional systems which operate on CAD or mathematical models are ill suited. The technique can be used to add fillets at the junction of two surfaces as noted earlier, to blend two surfaces continuously, or to add draft to surfaces so that casting is possible, operations which are difficult and time-consuming to perform using traditional techniques.

Virtual machining techniques can be used to simulate manufacturing processes and to calculate mass properties of the manufactured part. For example this technique can determine the distribution of weights necessary to balance an engine crankshaft, or calculate the volume and surface area of a combustion chamber. By modeling all the tools used in the machining process of a cylinder head and considering the process tolerances, computer models may be implemented which simulate the effect of a given choice of tool positions and orientations. By using methods such as Monte-Carlo simulation, the actual production of a machining line can be simulated and studied for purposes of process improvement.

The modified HDPDM can further be used to directly create tool paths for machining a prototype using point to point techniques. The density of points can be sufficiently high to achieve quite accurate and smooth parts. Five axis techniques which employ surface normal information from the HDPDM can be used for achieve optical quality results for reflector molds.

It is to be understood that the specific arrangements described are merely illustrative examples of the use of the invention. While the preferred embodiment has been shown and explained with the use of 3-dimensions, the principles at the invention may also be applied to use in one or two dimensional applications. Numerous modifications may be made to these arrangements without departing from the true spirit and scope of the invention.

What is claimed is:

1. Apparatus for modeling and manipulating shapes comprising, in combination, memory means for storing a representation of an initial shape, the representation directly defining the initial shape by means of coordinates of points;

means defining the coordinates of a plurality of points defining the position of a predetermined tool shape, means defining an axis of projection in an n-dimensional coordinate system to which the coordinates of the points defining the initial shape and the coordinates of the points belonging to the tool shape both belong, means for identifying each given point on said initial shape which is in alignment with a corresponding point on said tool shape along a line parallel to said axis of projection, and means for altering the coordinates of each of said given points to specify the coordinates of said corresponding point on said tool shape, thereby forming a stored representation of an altered shape in said memory means, the altered shape having a representation which directly defines the altered shape by means of coordinates of points.

2. Apparatus as set forth in claim 1 further comprising means for forming successive further modified representations of said altered shape comprising:

transform means for translating the representation of said altered shape to a new position in said coordinate system with respect to said tool shape and said axis of projection to produce a representation of a repositioned shape in said memory means, and means including said means for identifying and said means for altering to produce a succession of further modified representations, and utilization means for forming an output manifestation of the last of said succession of modified representations.

3. Apparatus as set forth in claim 1 wherein
said input means comprises digital scanning means for producing a set of scanner output values representing a physical object and means for deriving from said set of scanner output values the coordinates of the points defining the initial shape.

4. Apparatus as set forth in claim 1 wherein
said input means comprises tessellating means for translating the discrete shape elements of a CAD model for a given shape into the coordinates of the points defining the initial shape.

5. Apparatus as set forth in claim 1 wherein
said input means comprises processing means for evaluating mathematical representations of a shape to produce the coordinates of the points defining the initial shape.

6. Apparatus as set forth in claim 2 wherein said utilization means includes means for forming a physical object having a shape corresponding to the last of said succession of modified representations.

7. Apparatus as set forth in claim 2 wherein said utilization means includes means for translating the last of said succession of modified representations into a set of discrete shape definitions which together form an approximate CAD model representation of an output shape.

8. Apparatus as set forth in claim 2 wherein said utilization means includes means for translating the last of said succession of modified representations into one or more recorded mathematical representations of an output shape.

9. A method of producing and manipulating a model of a three-dimensional object utilizing an electronic computer consisting at least of a processor and memory, said method comprising, in combination, the steps of:

(a) storing a representation of the object in the memory means, the representation directly defining the object by means of coordinates of points, (b) specifying coordinates of a group of points defining a tool surface, (c) specifying the orientation of an axis of projection in a coordinate system to which the coordinates of the points defining the object and the coordinates of the group of points both belong, (d) identifying each given point on the surface of said object which is aligned with one of said group of points defining said tool surface along a line parallel to said axis of projection, and (e) altering the values stored in said memory to effectively move each of said given points to the aligned one of said group of points defining said tool surface, thereby forming a modified shape representation in said memory, the modified shape representation directly defining the modified shape by means of coordinates of points.

10. The method set forth in claim 9 further comprising the steps of:

(f) processing the values in said memory to reposition said modified shape representation with respect to said group of points defining said tool surface; and (g) repeating steps (d) and (e) to form a further modified shape representation in memory.

11. Apparatus for modeling and manipulating shapes comprising, in combination, memory means for storing
a representation of an initial shape, the representation directly defining the initial shape by means of coordinates of points and
a representation of a tool shape;
means for defining a relationship in an n-dimensional coordinate system between the representation of the tool shape and the representation of the initial shape; and
means for altering the representation of the initial shape to produce a representation of an altered shape in the memory means as required by the relationship between the representation of the tool shape and the representation of the initial shape, the representation of the altered shape being directly defined by means of coordinates of points.

12. The apparatus set forth in claim 11 wherein:
the representation of the tool shape directly defines the tool shape by means of coordinates of points.

13. The apparatus set forth in claim 12 wherein the means for defining a relationship comprises:
transforming means for transforming the coordinates of the points of the tool shape and/or the coordinates of the points of the initial shape such that they both belong to the n-dimensional coordinate system;
means defining an axis of projection in said n-dimensional coordinate system to which the coordinates of the points defining the initial shape and the coordinates of the points belonging to the tool shape both belong,
means for altering the coordinates of each of said given points to specify the coordinates of said corresponding point on said tool shape, thereby forming the representation of the altered shape, and
means for identifying each given point on said initial shape which is in alignment with a corresponding point on said tool shape along a line parallel to said axis of projection.

14. The apparatus set forth in claim 13 wherein:
the means for altering the representation of the initial shape does so by altering the coordinates of each of said given points to specify the coordinates of said corresponding point on said tool shape, thereby forming a stored representation of an altered shape in said memory means.

15. A method of producing and manipulating a model of a three-dimensional object utilizing an electronic computer consisting at least of a processor and memory, said method comprising, in combination, the steps performed by the processor of: representing an initial shape in the memory such that the initial shape is directly defined by means of coordinates of points;

representing a tool shape in the memory;

defining a relationship in an n-dimensional coordinate system between the representation of the tool shape and the representation of the initial shape; and altering the representation of the initial shape to produce a representation of an altered shape in the memory means as required by the relationship between the representation of the tool shape and the representation of the initial shape, the representation of the altered shape being directly defined by means of coordinates of points.

16. The method set forth in claim 15 wherein:

the tool shape is represented in the memory such that the tool shape is directly defined by means of coordinates of points.

17. The method set forth in claim 16 wherein the step of defining a relationship comprises the steps of:

transforming the coordinates of the points of the tool shape and/or the coordinates of the points of the initial shape such that they both belong to the n-dimensional coordinate system;

defining an axis of projection in said n-dimensional coordinate system to which the coordinates of the points defining the initial shape and the coordinates of the points belonging to the tool shape both belong, altering the coordinates of each of said given points to specify the coordinates of said corresponding point on said tool shape, thereby forming a stored representation of an altered shape in said memory means, and identifying each given point on said initial shape which is in alignment with a corresponding point on said tool shape along a line parallel to said axis of projection.

18. The method set forth in claim 17 wherein:

the step of altering the representation of the initial shape alters the coordinates of each of said given points to specify the coordinates of said corresponding point on said tool shape, thereby forming the representation of the altered shape.

* * * * *